United States Patent [19]

Gershfeld

[11] Patent Number: 6,091,447
[45] Date of Patent: Jul. 18, 2000

[54] METHODS OF EVALUATING PERFORMANCE OF VIDEO SYSTEMS AND COMPENSATING FOR DEGRADATION OF VIDEO SIGNALS

[76] Inventor: Jack Gershfeld, 273 Brookshire Pl., Brea, Calif. 92621

[21] Appl. No.: 08/942,328

[22] Filed: Oct. 1, 1997

[51] Int. Cl.[7] .......................... H04N 17/00; H04N 17/02
[52] U.S. Cl. .......................... 348/180; 348/177; 348/181
[58] Field of Search ...................... 348/177, 178, 348/180, 181, 182, 183; H04N 17/00, 17/02

[56] References Cited

U.S. PATENT DOCUMENTS

| | | | |
|---|---|---|---|
| 3,978,282 | 8/1976 | Fulton, Jr. | 348/180 |
| 4,028,625 | 6/1977 | Behrend | 348/180 |
| 5,214,500 | 5/1993 | Takayama et al. | 348/180 |
| 5,231,489 | 7/1993 | Penney | 348/180 |

*Primary Examiner*—Nathan Flynn
*Assistant Examiner*—Vivek Srivastava
*Attorney, Agent, or Firm*—Vladimir Khiterer

[57] ABSTRACT

Methods of evaluating performance of a video system and compensating for degradation of video signals caused by the video system are disclosed. A frequency sweep is passed through the video system that is being evaluated, causing the video system to output a degraded frequency sweep having amplitude variations. The degraded frequency sweep having amplitude variations is then passed through an amplitude peak level detector. The amplitude peak level detector outputs a low frequency signal with amplitude variations corresponding to the amplitude variations occurring in the degraded frequency sweep. This low frequency signal is then applied to a video display device allowing to evaluate performance of the video system by either brightness or colors of the images on the screen. A compensation means can be employed to compensate for the degradation. Since a low frequency signal is applied to a video display device, these methods permit the use of low grade and inexpensive monitors for evaluating performance of video systems designed to transmit high frequencies.

33 Claims, 14 Drawing Sheets

FIG.3 (SIGNAL AT JUNCTION A)

FIG.4 (SIGNAL AT JUNCTION B)

FIG.5 (SIGNAL AT JUNCTION C)

FIG.9 (SIGNAL AT JUNCTION D)

FIG.10 (SIGNAL AT JUNCTION E)

FIG.11 (SIGNAL AT JUNCTION F)

METHODS OF EVALUATING PERFORMANCE OF VIDEO SYSTEMS AND COMPENSATING FOR DEGRADATION OF VIDEO SIGNALS

BACKGROUND

The present invention is in the field of video systems. More particularly, the present invention relates to various methods of visually testing video systems for degradation of video signals that pass through video systems, as well as methods of compensating for this degradation.

Video systems may include a variety of video sources, including but not limited to computers, video cassette recorders, video cameras, and a variety of display devices, including but not limited to CRT monitors, CRT projectors, LCD projectors, DLP projectors, or other video display devices. The video sources can generate video signals of many types, including but not limited to NTSC, PAL, SECAM, as well as the types produced by computers, such as composite, monochrome analog, RGB, RGBS, RGBHV, RGsB, RsGsBs, and any additional video standards developed by IBM for personal computer compatible technology, including but not limited to CGA, EGA, VGA, SVGA, and XVGA type signals and any other standards developed by industry associations like VESA.

Regardless of the specific types of video signals produced, video signals frequently require processing and manipulation before they reach video display devices. To this end, video switchers, video distribution amplifiers, fiber-optic transmitters, fiber-optic receivers, RF-modulators and demodulators and other equipment, as well as various types of interconnecting cables, are frequently installed between video signal sources and video display devices.

Those ordinarily skilled in the pertinent arts will recognize that after video signals pass through such video system and reach video display devices, the quality of the video signals frequently degrade. The degree and type of degradation of a video signal depends upon the characteristics of components of the circuits through which the video signal is passing. The number and the individual characteristics of these components, as well as the characteristics and length of interconnecting cables used to connect them together determine the video signal degradation level.

Conventionally, in order to determine degradation level of a video signal a subjective judgment is often employed. An individual would look at an image and estimate the quality of the video signal by the way the image appears on the screen. Based on such observations, the individual would draw a conclusion regarding the performance of the video system. Obviously, in this situation the objective quality of the performance of the video system can not be properly determined because it strongly depends on the ability of the individual to make a proper visual assessment.

Alternatively, one can employ network analyzers that test video systems by measuring various video bandwidth characteristics which relate to attenuation or gain of video signals at different frequencies. However, those skilled in the pertinent arts will recognize that network analyzers, aside from being expensive, also require close proximity between video signal sources and video display devices, which in many cases is not possible. Additionally, specially trained personnel who are often in short supply and expensive are required to operate complex network analyzers.

Yet another method is available by utilizing a "split screen comparison" in which a reference video signal (the video signal that has not passed through the video system) and a degraded video signal (the video signal that has passed through the video system) are displayed side by side on different portions of the screen of the video display device. Based on the observations of the two images, one would make a comparison and draw a conclusion regarding the performance of the video system. Although this method is better then the two previous methods, the accuracy of such comparison strongly depends on the quality of the video display device used for the comparison. For example, if the video system is designed to have a 300 MHz video signal bandwidth, but the video display device has specification of only 100 MHz video signal bandwidth, there will be no possible way of observing degradation of video signals above 100 MHz.

There is also a method of evaluating performance of a video system by comparing the quality of an original video signal with a degraded video signal by using two similar display devices. However, this method also depends on the quality of the display devices in order to make an accurate determination regarding the video system performance. Moreover, both displays should be in close proximity so that both images can be readily compared. In many situations this is not possible since an input of a video system may be located 200–300 feet away from an output of the video system.

Accordingly, a clear need exists for an inexpensive and simple method of evaluating performance of video systems for degradation of video signals, as well as compensating for the degradation of the video signals that pass through video systems, in order to provide the highest quality image possible while making this measurement independent of the quality or performance of the display device.

OBJECT AND SUMMARY OF THE INVENTION

The present invention is directed to methods of evaluating performance of video systems and methods of compensating for the degradation of video signals after passing through the video systems, while making such evaluating and compensating independent of the performance of the video display device used for this evaluating and compensating, in which the methods meet the needs discussed above.

A first improved method, which is the subject matter of this invention, comprises the steps of generating a frequency sweep comprising a signal that comprises a sinewave of a continuously variable frequency. Those ordinarily skilled in the pertinent arts will recognize that this can be accomplished by a voltage controlled oscillator generating a variable frequency sinewave of a frequency range which covers the expected frequency range of a video system. For example, if a video system needs to be tested for the video bandwidth of 1 MHz to 50 MHz, then voltage controlled oscillator is designed to generate a frequency sweep of this range. These types of oscillators are readily available and are able to cover frequency ranges from 1 MHz to 1.2 GHz.

Another method of generating a frequency sweep is to use digital frequency synthesizers. These devices can be controlled by a microprocessor and provide desired frequency sweep with sinewave frequency ranges of 1 Hz to 200 MHz.

The frequency sweep is then passed through the circuit of the video system that is being evaluated causing the circuit to output a degraded frequency sweep. Those knowledgeable in the pertinent arts will recognize that degradation of the frequency sweep caused by the circuit will manifest itself in amplitude variations occurring in each of the frequencies of the degraded frequency sweep. Specifically, before passing through the circuit, sinewave amplitudes at all frequencies of which the frequency sweep is comprised would be the same. However, after passing through the circuit, these amplitudes will decrease or increase depending on the video system characteristics.

The next step is to pass the degraded frequency sweep through a device capable of detecting amplitude peak level variations of the degraded frequency sweep. Typically, amplitude peak level detectors are constructed with a silicon diode in a feedback loop of an operational amplifier. Many circuits currently exist to detect peak level variations of a signal with the frequency range of 1 Hz to 1 GHz. Those knowledgeable in the pertinent arts will recognize that the amplitude peak level detector will output a low frequency signal having amplitude variations corresponding to the amplitude variations occurring in each of the different frequencies of the degraded frequency sweep discussed above. The amplitude peak detector can be similar to those used in AM radio receivers.

It should be clear to those knowledgeable in the pertinent arts that this low frequency signal can be sent to a video display device where images generated by this signal will be displayed in a way that brightness of an image will be proportional to the amplitude of the signal generating such image.

It is most convenient, but not necessary, to display such images as horizontal scan lines corresponding to different frequencies. Typically, the scan lines corresponding to the highest frequency would be on the top portion of the screen and the scan lines corresponding to the low frequencies would be displayed on the bottom portion of the screen.

Those ordinarily skilled in the pertinent arts will recognize that in order to achieve this result, the frequency sweep is generated during one frame time between two vertical sync pulses. During the beginning of the vertical deflection the frequency sweep generator will generate high frequency signal. As the vertical sweep progresses from top to bottom, the frequency will be reduced until the lowest frequency at the end of the sweep. Typically, for 1 frame refresh at 60 Hz it takes about 16.66 ms to sweep frequency from the highest to the lowest frequency range.

Those knowledgeable in the pertinent arts will also recognize that brightness of the scan lines displayed on the screen of the video display device will depend on the amplitude variations occurring in each of the different frequencies of the degraded frequency sweep. The scan lines on the screen of the video display device will be presented in a way that darker scan lines will correspond to lower values of amplitude and lighter scan lines will correspond to higher values of amplitude. Accordingly, degradation of video signals that pass through the circuit can be evaluated by observing the brightness of the scan lines corresponding to different frequencies of the video signal.

Brighter scan lines will indicate higher gain of the video system with respect to a reference signal at certain frequency and a need to reduce gain at that frequency with a means of adjusting video system performance. Darker scan lines will indicate lower gain of the video signal at certain frequency with respect to reference signal and a need to increase gain of the video system at that frequency.

It is most convenient, but not necessary to have the reference brightness of the system performance adjusted to the lowest frequency passed through the video system. The reason for this is that most video systems typically have the least amount of degradation at the lowest frequency. On the other hand an absolute reference signal can be provided without taking into account frequency value.

It is also possible to generate a absolute reference brightness signal on the screen that can provide reference brightness for comparison. For example, a vertical bar with the reference brightness level can be generated on the right side of the screen for visual comparison. This bar can be generated by providing a square wave pulse at the end of each horizontal deflection line. The amplitude of this pulse can be adjusted such as to provide desired reference brightness level. Depending on the preference, the same bar can be generated on the right side or the left side of the screen, or on both sides for easy comparisons.

One of the major advantages of this method is that the signal outputted by the amplitude peak level detector and sent to the video display device contains mainly low frequency components of the degraded video signal. Therefore, as should be apparent to those ordinarily skilled in the pertinent arts, there is no need to use expensive and high quality video display devices for evaluating performance of video systems. In fact, this feature will permit the use of a regular television grade monitor for testing high resolution video systems with video bandwidth in excess of 500 MHz.

According to a further feature of the present invention, after passing the original frequency sweep through the video system, thereby outputting a degraded frequency sweep, and after passing the degraded frequency sweep through the amplitude peak level detector, there is provided an additional step of encoding the amplitude variations of frequency sweep signal occurring at different frequencies of the frequency sweep with colors in a way that different values of amplitude variations are encoded with different and distinct colors.

Those ordinarily skilled in the pertinent arts will recognize that this can be accomplished by digitizing resultant low frequency video signal and passing it through a RAM based look up table that assigns different colors to different amplitudes of the low frequency video signal. The resolution at which low frequency video signal is digitized will determine how many color variations will be visible on the screen. A typical resolution of 6 to 8 bits will be more then sufficient to provide good visual representation of a video system performance.

For example, amplitude variations of 10% from the reference can be encoded with green color hues, amplitude variations of minus 20% from the reference can be encoded with yellow color hues, amplitude variations of plus 20% can be encoded with blue color hues, amplitude variations of minus 40% can be encoded with red color hues and amplitude variations of plus 40% can be encoded as variations of violet color hues. It will be also apparent to those ordinarily skilled in the pertinent arts that since color assignments are based on the lookup table, any colors can be used to represent amplitude variations from the reference level. The reference level can be displayed in white color for easy identification. Similar to the method discussed above, a side bar with reference colors can be also provided for comparison purposes.

The next step is to send this low frequency signal having each selected value of amplitude variations occurring in the degraded frequency sweep encoded with a distinct and different color to a video display device. Since the degraded video signal contains mainly low frequency components of the amplitude variations, it can be further encoded and converted to RF frequency and sent out over regular airwaves or coaxial cable to be viewed remotely.

It is most convenient, but not necessary, to display the images as horizontal scan lines corresponding to different frequencies. By observing the color of the scan lines on the screen of the video display device, one can evaluate performance of the video system and how it degrades the video signals that pass through the video system. In the example discussed above, green scan lines will indicate small values of amplitude variations occurring in the frequency sweep of 10% and therefore more degradation and worse performance of the video system with respect to the frequencies represented by white scan lines. Red scan lines will indicate large values of amplitude variations occurring in the frequency sweep of 40% and therefore even more degradation and even worse performance of the video system with respect to the frequencies represented by white scan lines.

Regardless of whether performance of a video system is evaluated by brightness of images generated by the above-described degraded frequency sweep or by colors of such images, a yet another feature of the present invention provides for compensating for degradation of video signals that pass through the video system. Compensation is accomplished by way of an additional step of passing the degraded frequency sweep outputted by the video system through a compensation means having adjustment controls before sending the degraded frequency sweep to the amplitude level peak detector. In case of evaluating video systems by brightness of the images, when the images are displayed on the screen of the video display device, compensating for degradation is done by altering the adjustment controls so that the images appear as uniform as possible within the limitations of a particular video system and compensation means.

A reference signal can be displayed on the video screen to establish a small area that has reference brightness level that corresponds to no degradation. Typically, this can be done by generating a reference vertical line of pre-determined amplitude on the right or left side of the screen of the video display device.

In case of evaluating performance of video systems by colors of the image, when the image is displayed on the screen of the video display device, compensating for degradation is done by altering the adjustment controls so that the colors of the images correspond to the smallest degradation within the limitations of a particular video system and compensation means. In the example discussed above, the video system is adjusted so that the screen of the video display device appears white without any colors showing. Those ordinarily skilled in the pertinent arts will recognize that such compensating can be accomplished, for example, by applying adjustments for compensating gain characteristics and frequency response of a video system.

The above-described methods which are the subject matter of this invention employ a frequency sweep signal comprising of continuously variable frequency, which is passed through the video system in order to evaluate performance. However, as should be apparent to those knowledgeable in the pertinent arts, in all of the above-described methods, a frequency sweep comprising a plurality of fixed frequencies can be used instead of a frequency sweep comprising of continuously variable frequency. This can be accomplished by combining signals outputted by several fixed sinewave frequency generators. In a typical application, one may use a plurality of crystal oscillators, each set at a specific frequency. Most crystal oscillators have enable/disable capabilities that allow to turn these oscillators on and off at predetermined time selected by a designer of a circuit.

For example, in utilizing this invention one may use oscillators with fixed frequencies of 1 MHz, 3 MHz, 5 MHz and 10 MHz for evaluating performance of video systems up to 10 MHz. When the vertical deflection on the monitor starts to scan from top to bottom, the 10 MHz oscillator is turned on first and after several milliseconds it is turned off and the next oscillator turned on. This continues until all oscillators are turned on and off by the end of the vertical deflection. Although not as precise as the first method of sweeping frequency, this method can provide some cost savings.

According to yet a still further feature, there is provided a method of compensating for degradation which permits comparison of the images generated by the degraded frequency sweep outputted by the video system that is being evaluated with the images generated by the frequency sweep after passing through the means of compensation by simultaneously displaying the degraded and adjusted images on different portions of the screen of the video display device. This method involves an additional step of passing the degraded frequency sweep through a video splitter capable of converting the degraded frequency sweep into two substantially identical portions of said degraded frequency sweep. One of said identical portions is then passed through the compensation means and the amplitude peak level detector, as well as the means of color coding, if applicable, resulting in the signal corresponding to the adjusted frequency sweep. The other one of said identical portions is not passed through the compensation means but applied directly to the amplitude peak level detector, as well as the means of color coding, if applicable, resulting in the signal corresponding to the degraded frequency sweep. The two signals are then combined and the degraded and adjusted images generated by these signals are displayed on different portions of the screen of the video display device. It is most convenient, but not necessary, to display the degraded and adjusted images side by side. For example, the adjusted image can occupy the left side of the screen and the degraded image can occupy the right side of the screen. The adjusted image is then adjusted by altering controls of the compensation means while being compared to the degraded image simultaneously displayed on the screen of the video display device.

Those skilled in the pertinent arts will recognize that the degraded frequency sweep can be converted into two substantially identical portions of same by means of, for example, a distribution amplifier. It should also be apparent that displaying images generated by the portions of the degraded frequency sweep on different portions of the screen of the video display device can be accomplished by means of switching one of the two portions of the degraded frequency sweep to the video display device at the predetermined time. For example, one of said two identical portions can be switched on during the first half of the horizontal deflection, and the other one can be switched on during the second half of the horizontal deflection. This will cause the images generated by both substantially identical portions of the degraded frequency sweep to appear on two different portions of the video display device.

According to yet another feature, in practicing this invention with video systems having multiple sources of video signals, one may employ a compensation means equipped with memories for adjustment settings for different combinations of devices for processing and manipulating video signals and cables used with such multiple sources. This permits selection (either manually or by signals from other devices) of specific adjustment settings corresponding to specific combinations of devices for processing and manipulating video signals and cables.

It is possible that the frequency sweep generated by means described above does not provide signal with constant amplitude across different frequencies. In this case the frequency sweep generator and the peak detector can be calibrated such as to compensate for initial signal amplitude variations. Doing this will improve performance of the equipment and make sure that quality of the measurements does not degrade with age of the equipment.

BRIEF DESCRIPTION OF THE DRAWINGS

The advantages of the present invention will become better understood with reference to the following description of preferred embodiments of the invention, appended claims, and accompanying drawing figures in which the same reference numeral indicates the same feature, or features which are analogous in structure or function.

DETAILED DESCRIPTION OF PREFERRED EMBODIMENTS OF THE PRESENT INVENTION

Throughout the following detailed description, it should be understood by those skilled in the pertinent arts, that references to electrical communication shall not be limited to communications performed entirely by electrical means, but shall be understood that some portions of the overall communications of the electrical signals may be performed by other means, including but not limited to optical, RF, ultrasound, magnetic, microwave, acoustic and other signals and means now known to those skilled in the pertinent arts or later developed.

Figure 1:
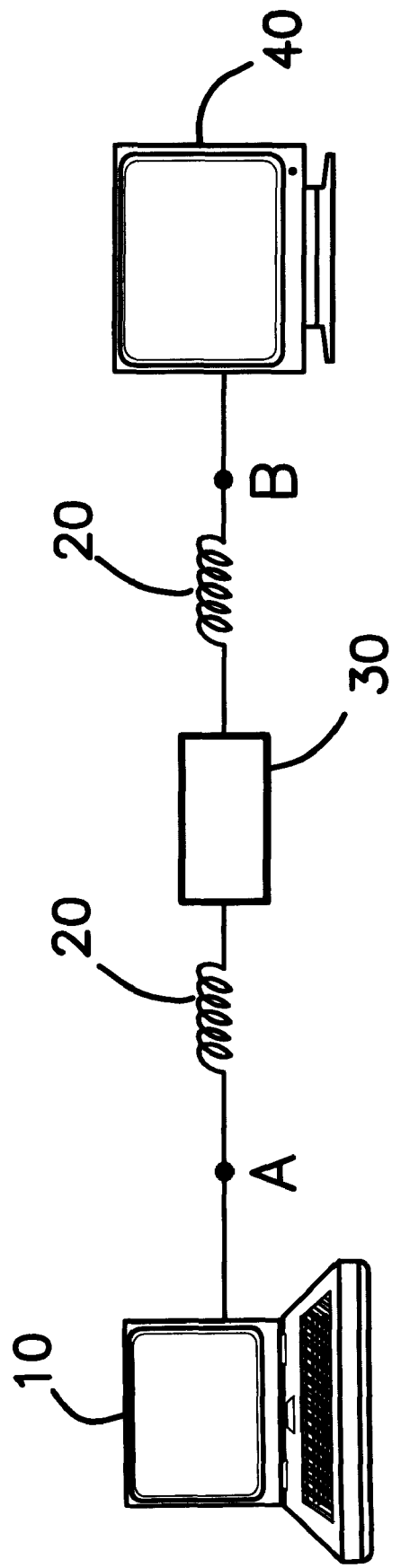
FIG. 1 provides a schematic presentation of a video system to which the methods embodying the present invention are applied.

The initial discussion of a preferred embodiment shall be made by reference to FIG. 1. Starting on the left hand portion of FIG. 1, there is provided a Video Signal Source 10 which is placed in electrical communication with the first end of a Cable 20 at Junction A. Video Signal Source 10, which in this embodiment is shown as a computer, could be any number of other video sources producing a wide variety of types of video signals. For example, Video Signal Source 10 could be a video camera, a video cassette recorder (VCR), a video tape recorder, a video disc player, a DVD, video generator, and any number of other video signal sources which are known to those ordinarily skilled in the pertinent arts.

Cable 20 represents any number of possible means for conducting a video signal, including but not limited to a coaxial, fiber optic, and twisted pair cable. Cable 20 conducts the video signal from Video Signal Source 10 to an Intermediary Circuit 30 which comprises any number of possible circuit elements. Intermediary Circuit 30 is generally composed of devices for processing and manipulating video signals, which may include distribution amplifiers, matrix switchers, interfaces and any number of other devices which are known to those ordinarily skilled in the pertinent arts. The output of Intermediary Circuit 30 is placed in electrical communication with a second Cable 20, which conducts the video signal to Junction B which is in electrical communication with Video Display Device 40. The video signal generated by Video Signal Source 10 is displayed in some visual manner by Video Display Device 40. As shown in FIG. 1, Video Display Device 40 is a computer monitor, although other video display devices, such as TV monitors, projectors, LCD displays, DLP projectors, and a number of other devices are possible.

Junction A is usually located in close proximity to the Video Signal Source 10.

Junction B is usually located in close proximity to the Video Display Device 40.

All of the circuitry and cables located between Junction A and Junction B represent the video system which performance is being evaluated. No electronic circuitry can perfectly duplicate or process a video signal. Thus the video signal present at Junction B will be in some manner degraded or inferior to the video signal at Junction A which was generated by Video Signal Source 10. The method of the instant invention is used in conjunction with the circuitry, components and cables of the video system shown in FIG. 1 and enables a person to visually evaluate performance of the video system and compensate for the degradation of the video signal after between Junction A and Junction B.

Figure 2:
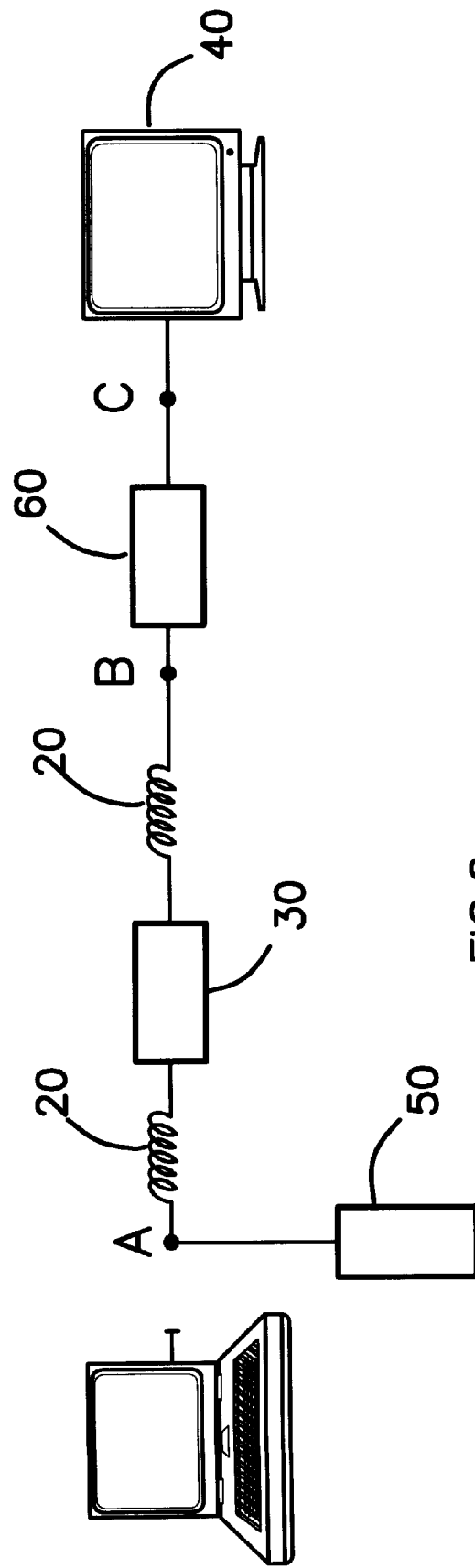
FIG. 2 provides a schematic presentation of the steps of evaluating performance of a video system by observing brightness of the images generated by the degraded frequency sweep according to the present invention.

Referring now to FIG. 2, a method will now be explained which permits the basic video system as shown in FIG. 1, to be evaluated. As part of the evaluation method described for FIG. 2 and all other figures, the normal video source is removed and a test signal is used for evaluation and for setting various compensation devices. Once these compensation devices have been set properly, the usual video source can be reconnected to the video system, with the compensation device now providing proper settings for a high quality, low distortion video signal.

Starting at the left side of FIG. 2, there is provided a Video Signal Source 10. However, in this test situation, Video Signal Source 10 has been removed from electrical communication with Junction A during the evaluation steps. Instead, Generator of Frequency Sweep 50, is placed in electrical communication with Junction A. Generator of Frequency Sweep 50 is capable of generating a frequency sweep comprising a signal that comprises a sinewave of a continuously variable frequency. This frequency sweep may include all or some of the frequencies contained in the video signals generated by Video Signal Source 10.

The circuitry as shown in FIG. 2, between Junction A and Junction B, is identical to the circuitry between Junction A and Junction B as shown in FIG. 1. However, in the circuit as shown in FIG. 2, Junction B is not placed in electrical communication with a video display device, but rather with an Amplitude Peak Level Detector 60.

Figure 3:
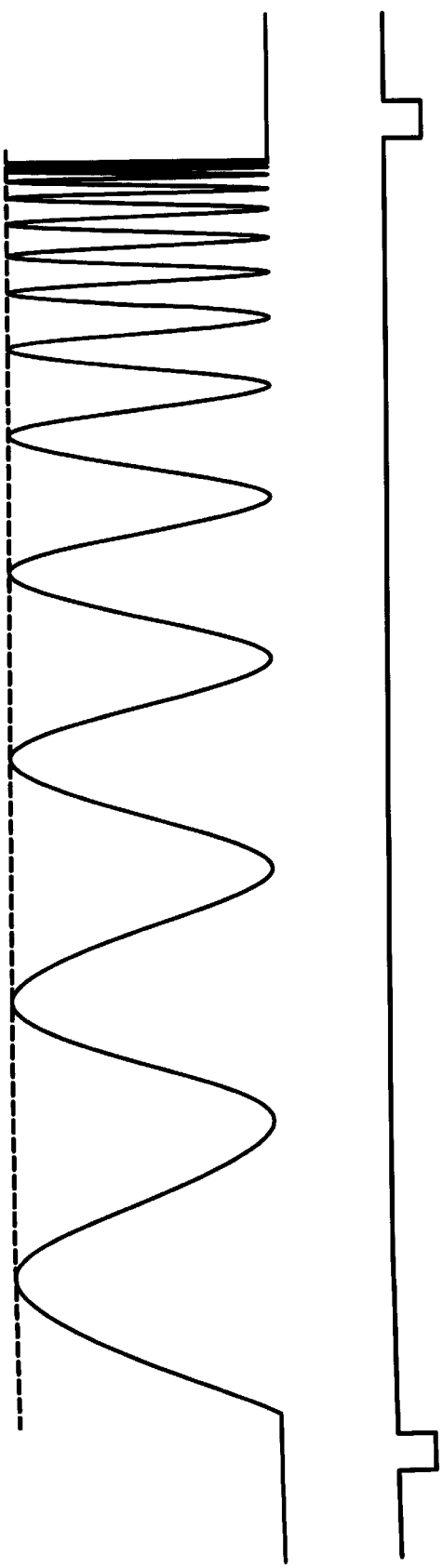
FIG. 3 provides a graph of the frequency sweep at junction A of FIG. 2.
Figure 4:
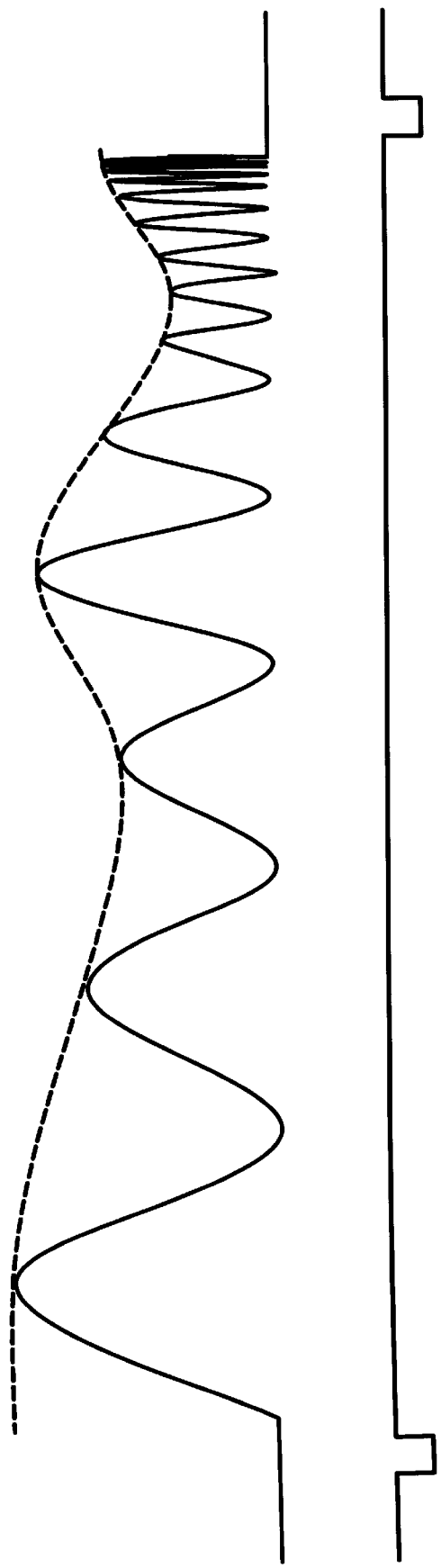
FIG. 4 provides a graph of the frequency sweep at junction B of FIG. 2.

Still referring to FIG. 2, Generator of Frequency Sweep 50 generates a frequency sweep as described above and outputs such frequency sweep at Junction A. Now referring to FIG. 3, which shows a graph of the frequency sweep at junction A of FIG. 2, each of the frequencies present at Junction A have the same amplitude. Going back to FIG. 2, the frequency sweep is passed through the circuitry and cables located between Junction A and Junction B. As discussed above, no electronic circuitry can perfectly duplicate or process a video signal. Thus the frequency sweep present at Junction B will be in some manner degraded or inferior to the frequency sweep at Junction A which was generated by Generator of Frequency Sweep 50. Degradation of the frequency sweep present at Junction B will manifest itself in amplitude variations occurring in each of the frequencies of the degraded frequency sweep. Specifically, as shown in FIG. 3, each of the frequencies present at Junction A have the same amplitude. However, after passing through the circuit, these amplitudes will decrease or increase depending on the performance of the video system. Now referring to FIG. 4, which shows a graph of the frequency sweep at Junction B of FIG. 2, it can be seen that the amplitude variations occurring in the frequency sweep will be different and unique to a particular frequency.

Figure 5:
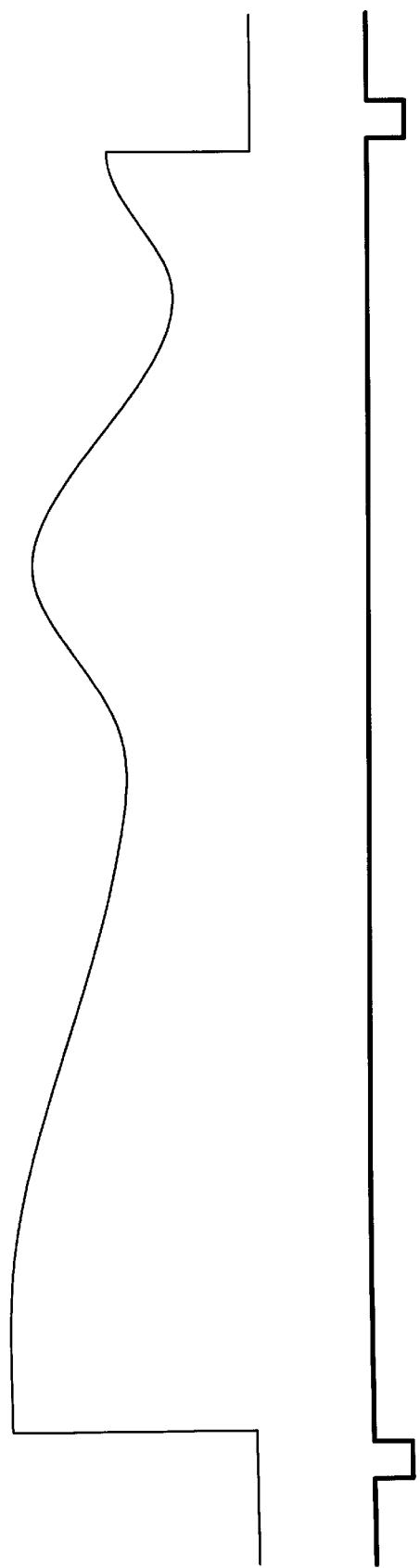
FIG. 5 provides a graph of the frequency sweep at junction C of FIG. 2.

Going back to FIG. 2, the degraded frequency sweep at Junction B is placed in electrical communication with Amplitude Peak Level Detector 60 causing it to output a low frequency signal at Junction C. Now referring to FIG. 5, which shows a graph of this low frequency signal at Junction C, it can be seen that this low frequency signal has amplitude variations corresponding to the amplitude variations occurring in the degraded frequency sweep at Junction B.

Going back to FIG. 2, the low frequency signal outputted by Amplitude Peak Level Detector 60 is placed in electrical communication with the Video Display Device 40. The images generated by each of the frequencies of the degraded frequency sweep (having different amplitudes) are then displayed on the screen of Video Display Device 40 in a way that each image is presented separate from each other and each image is not altered by the image generated by any other signal.

It is most convenient, but not necessary, to display such images as horizontal scan lines on the screen of Video Display Device 40 corresponding to different frequencies. Brightness of such scan lines (or images in any other form) will depend on the amplitude variations occurring in each of the different frequencies of the degraded frequency sweep. The scan lines on the screen of Video Display Device 40 will be presented in a way that darker scan lines will correspond to lower values of amplitudes and lighter scan lines will correspond to higher values of amplitudes. Accordingly, degradation of the degraded frequency sweep at Junction B can be evaluated by observing the brightness of the scan lines corresponding to different frequencies of said frequency sweep. Darker or lighter scan lines relative to the reference signal or relative to the amplitude of the lowest frequency signal will indicate higher degradation and worse performance of the video system with respect to a particular frequency.

Figure 6:
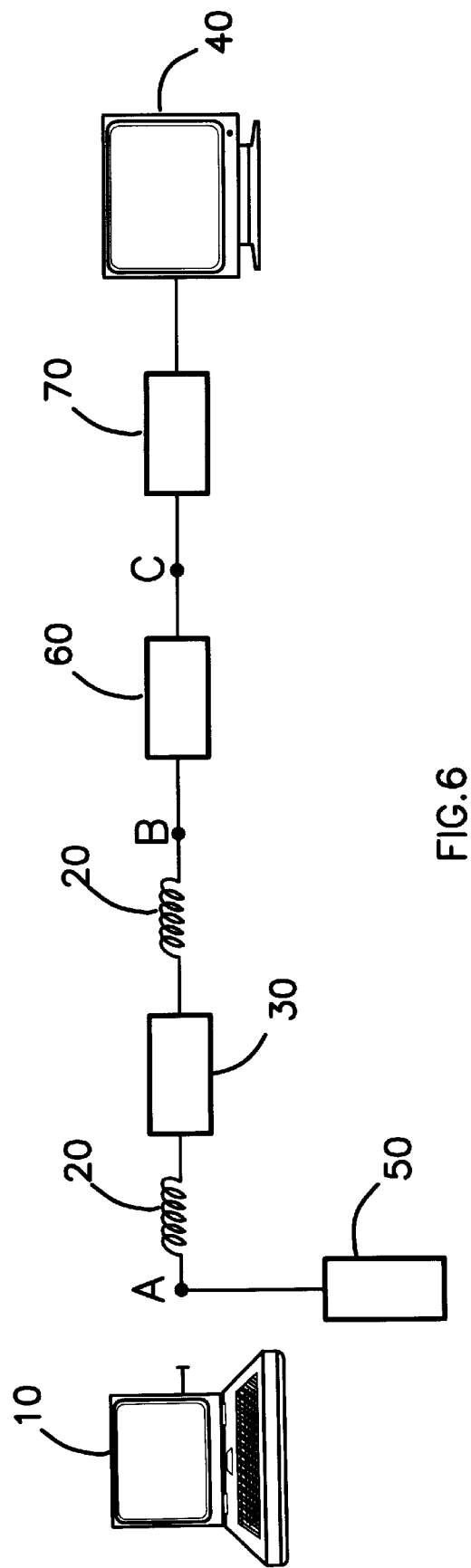
FIG. 6 provides a schematic presentation of the steps of evaluating performance of a video system by observing colors of the images generated by the degraded frequency sweep according to the present invention.

Referring now to FIG. 6, the low frequency signal outputted by Amplitude Peak Level Detector 60 at Junction C is not placed in electrical communication with Video Display Device 40 directly, as described in reference to FIG. 2. Rather, the low frequency signal outputted by Amplitude Peak Level Detector 60 is placed in electrical communication with a Means of Color Coding 70. Means of Color Coding 70 is capable of encoding selected values of amplitude variations occurring in the degraded frequency sweep with selected colors so that the images generated by the frequencies in the degraded frequency sweep can be displayed in selected colors corresponding to amplitude variations occurring in specific frequencies. In this example, Means of Color Coding 70 will encode amplitude variations of minus 10% from the reference with light green color hues and of plus 10% from the reference with dark green color hues. Amplitude variations of minus 20% from the reference will be encoded with yellow color hues, amplitude variations of plus 20% will be encoded with blue color hues, amplitude variations of minus 40% will be encoded with red color hues and amplitude variations of plus 40% will be encoded as variations of violet color hues. White color will correspond to zero degradation.

Accordingly, unlike in the method described by reference to FIG. 2, where brightness of the images was the measure of amplitude variations, here, colors of the images will be used to evaluate degradation. Images displayed in green or light green will indicated amplitude variations of only plus or minus 10% from the reference, i.e. low degradation. Images displayed in yellow or blue will indicate amplitude variations of plus or minus 20% from the reference—higher that 10% and therefore higher degradation than in images displayed in green. Red or violet color will indicate amplitude variations of plus or minus 40% from reference which means that the frequencies generating images displayed in red or violet are degraded the most and performance of the video system with respect to such frequencies is the worst.

Figure 7:
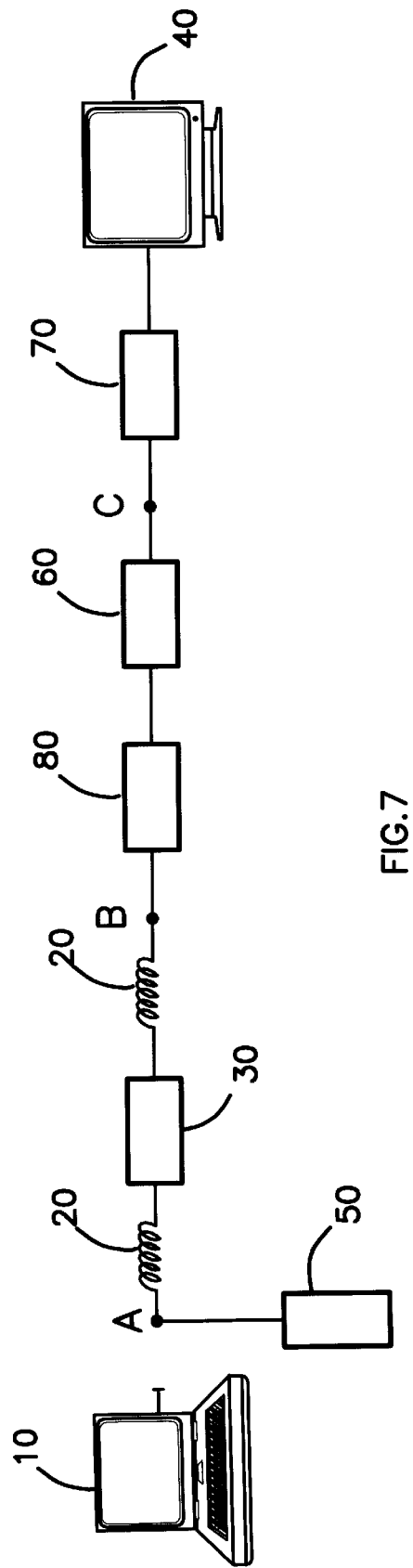
FIG. 7 provides a schematic presentation of the steps of evaluating performance of a video system and compensation for degradation of video signals caused by the video system by observing colors of the images generated by the degraded frequency sweep and altering adjustment controls of a compensation means according to the present invention.

Referring now to FIG. 7, it will be explained how to correct or compensate for the degradation that takes place in the video system. The circuitry in FIG. 7 is identical to FIG. 6 with the single addition of Compensation Means 80 between Junction B and Amplitude Peak Level Detector 60.

In review, Generator of Frequency Sweep 50 provides a frequency sweep that is conducted from Junction A to Junction B by passing through Intermediary Circuit 30 and Cables 20. However, instead of being placed in electrical communication with Amplitude Peak Level Detector 60, Compensation Means 80 is placed at Junction B to receive the frequency sweep that originated with Generator of Frequency Sweep 50.

The output of Compensation Means 80 is placed in electrical communication with Amplitude Peak Level Detector 60, which is followed by the steps of passing the low frequency signal outputted by Amplitude Peak Level Detector 60 through Means of Color Coding 70 and placing it in electrical communication with Video Display Device 40, in the same manner as described with reference to FIG. 6.

Therefore, as in FIG. 6, there are images of different colors (green, yellow, blue, red and violet) corresponding to amplitude variations displayed on the screen of Video Display Device 40. However, in this embodiment, there is a means to adjust or compensate the frequency sweep that originated from Generator of Frequency Sweep 50 so that the images displayed in red and yellow colors become white (ideally) or at least green. It will not always be possible to turn red and yellow images green or white by way of such adjustment, but this should be the objective under this method, within the limits of a particular video system and limits of a particular Compensation Means 80.

The method discussed in reference to FIG. 7 can also be used with the method discussed in reference to FIG. 2. The only difference will be that rather that trying to change colors of the images to green or white, the objective of the adjustment will be trying to turn dark images into a reference white images (indicating less amplitude variations and better performance).

Figure 8:
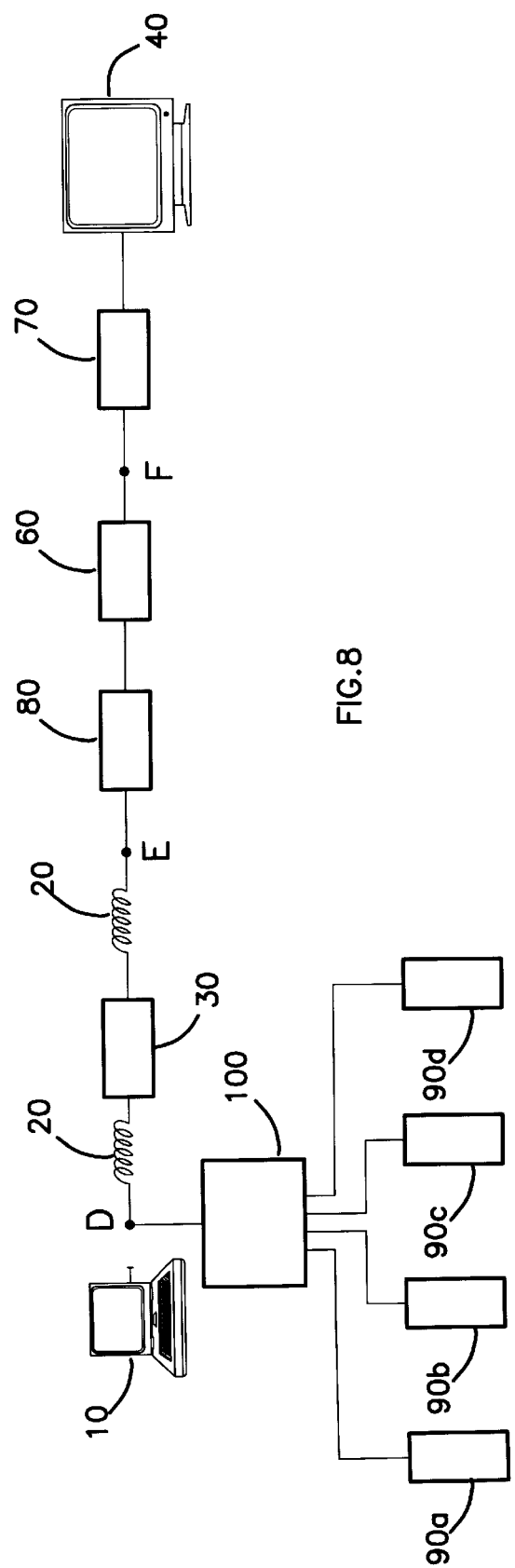
FIG. 8 provides a schematic presentation of the steps of evaluating performance of a video system and compensation for degradation of video signals caused by the video system by observing colors of the images generated by the degraded frequency sweep and altering adjustment controls of a compensation means in which a frequency sweep comprising a signal that comprises a sinewave of fixed frequencies is used instead of a frequency sweep comprising a signal that comprises a sinewave of a continuously variable frequency according to the present invention.

Referring now to FIG. 8, it will be explained how a frequency sweep comprising a plurality of fixed frequencies can be used instead of a frequency sweep comprising a continuously variable frequency, as disclosed above.

Viewing the left side of FIG. 8, instead of Generator of Frequency Sweep 50, there are provided Generators of Fixed Frequencies 90a, 90b, 90c, and 90d, which are placed in electrical communication with a Means of Combining Fixed Frequencies 100. In this example there are four generators of preset frequencies, even though there is no practical limit to how many such generators can be used. Each of these four generators is capable of generating fixed frequencies, including those produced by video signals generated by Video Signal Source 10. In this embodiment, Generators of Fixed Frequencies 90a, 90b, 90c, and 90d generate, respectively, 1 MHz, 3 MHz, 5 MHz and 10 MHz.

Means of Combining Fixed Frequencies 100 combines and synchronizes fixed frequencies which causes it to output a frequency sweep comprising a plurality of fixed frequencies at Junction D.

The circuitry as shown in FIG. 8, to the right of Junction D is identical to the circuitry to the right of Junction A as shown in FIG. 7. Furthermore, other than using generators of fixed frequencies instead of Generator of Frequency Sweep 50, the steps disclosed in the method in reference to FIG. 8 are identical to the steps disclosed in reference to FIG. 7.

Figure 9:
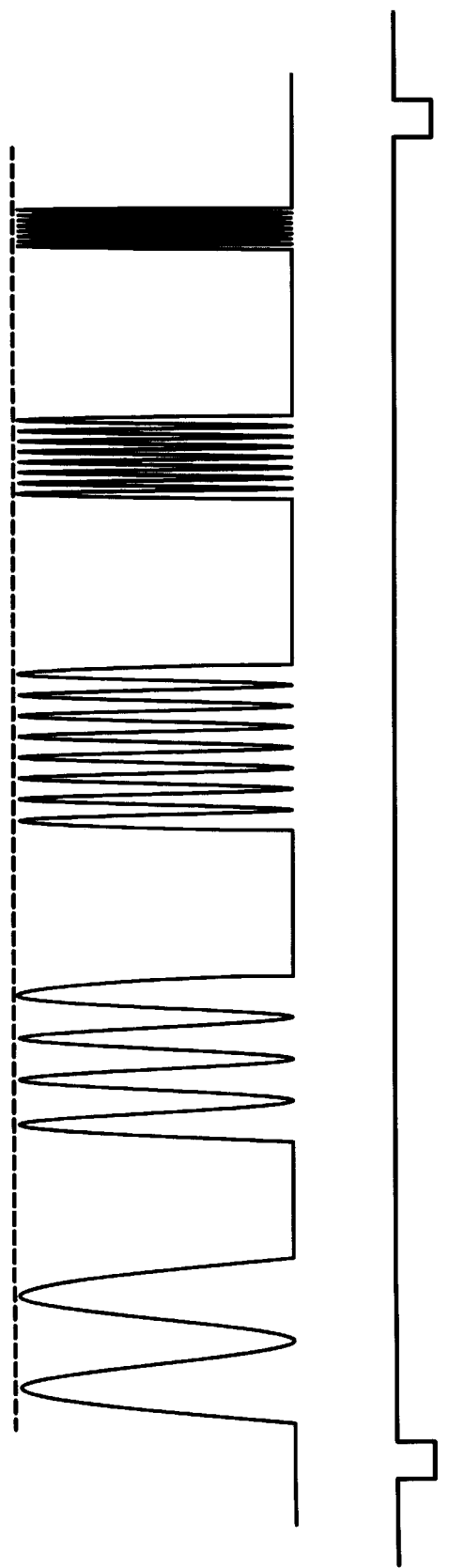
FIG. 9 provides a graph of the frequency sweep at junction D of FIG. 8.

Now referring to FIG. 9, which shows a graph of the frequency sweep at junction D of FIG. 8, each of the fixed frequencies present at Junction D have the same amplitude. Going back to FIG. 8, the frequency sweep is passed through the circuitry and cables located between Junction D and Junction E. As discussed above, no electronic circuitry can perfectly duplicate or process a video signal. Thus the frequency sweep present at Junction E will be in some manner degraded or inferior to the frequency sweep at Junction D which was generated by Generators of Fixed Frequencies 90a, 90b, 90c, and 90d.

Figure 10:
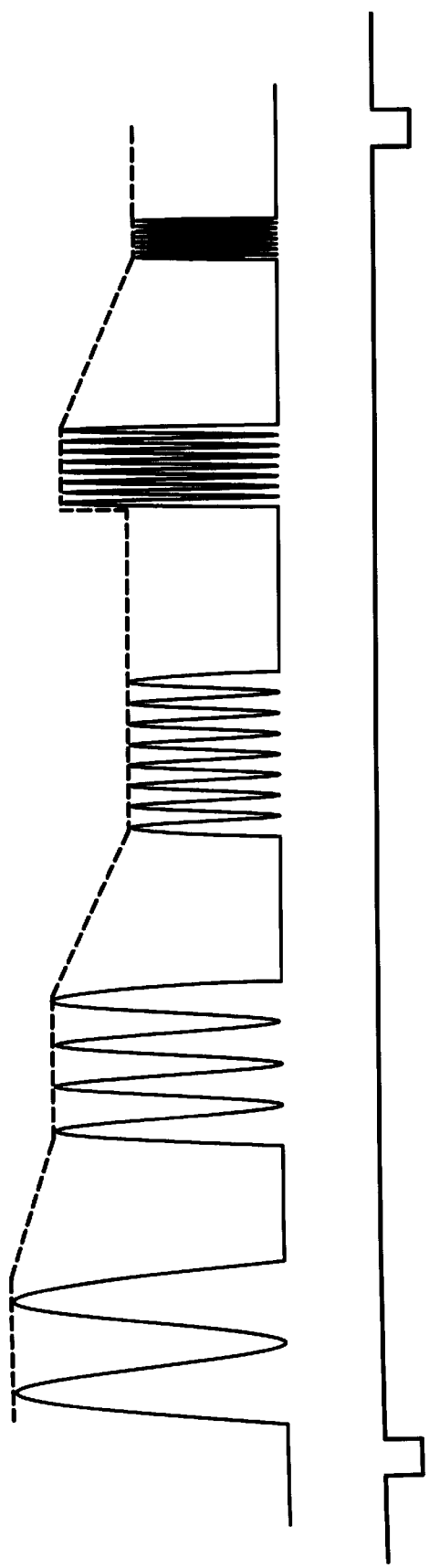
FIG. 10 provides a graph of the frequency sweep at junction E of FIG. 8.

Degradation of the frequency sweep present at Junction E will manifest itself in amplitude variations occurring in each of the fixed frequencies of the degraded frequency sweep. Specifically, as shown in FIG. 9, each of the fixed frequencies present at Junction D have the same amplitude. However, after passing through the circuit, these amplitudes will decrease or increase. Now referring to FIG. 10, which shows a graph of the frequency sweep at Junction E of FIG. 8, it can be seen the amplitude variations occurring in each of the fixed frequencies will be different and unique to a particular frequency.

Figure 11:
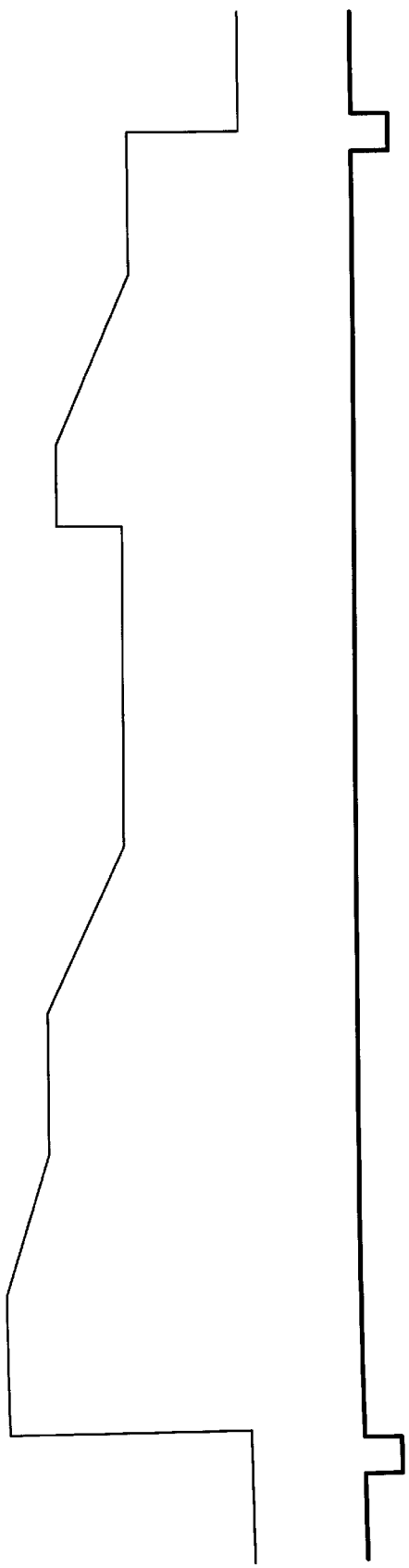
FIG. 11 provides a graph of the frequency sweep at junction F of FIG. 8.

Going back to FIG. 8, the degraded frequency sweep at Junction E is placed in electrical communication with Compensation Means 80. Output of Compensation Means 80 is placed in electrical communication with Amplitude Peak Level Detector 60 causing it to output a low frequency signal at Junction F. Now referring to FIG. 11, which shows a graph of this low frequency signal at Junction F, it can be seen that this low frequency signal has amplitude variations corresponding to the amplitude variations occurring in each of the fixed frequencies of the degraded frequency sweep at Junction E.

Going back to FIG. 8, the low frequency signal outputted by Amplitude Peak Level Detector 60 is placed in electrical communication with Means of Color Coding 70. Means of Color Coding 70 is capable of encoding selected values of amplitude variations occurring in the degraded frequency sweep with selected colors so that the images generated by the frequencies in the degraded frequency sweep can be displayed in selected colors corresponding to amplitude variations occurring in specific frequencies. In this example, Means of Color Coding 70 will encode amplitude variations of plus 10% from the reference with dark green color hues and minus 10% from the reference with light green color hues. Amplitude variations of minus 20% from the reference will be encoded with yellow color hues, amplitude variations of plus 20% will be encoded with blue color hues, amplitude variations of minus 40% will be encoded with red color hues and amplitude variations of plus 40% will be encoded as variations of violet color hues. White color will correspond to zero degradation.

Accordingly, images displayed in light or dark green color will indicated amplitude variations of only 10% from the reference, i.e. low level of degradation. Images displayed in yellow or blue will indicate amplitude variations of plus or minus 20% from the reference—higher that 10% and therefore higher degradation than in images displayed in green. Red or violet color will indicate amplitude variations of plus or minus 40% from reference which means that the frequencies generating images displayed in red or violet are degraded the most and performance of the video system with respect to such frequencies is the worst.

Similar to the method disclosed in reference to FIG. 7, Compensation Means 80 is used to adjust performance by trying to change colors of the images displayed on the screen of Video Display Device 40 to green or white.

The above example shows how a frequency sweep comprising a plurality of fixed frequencies can be used instead of a frequency sweep comprising a continuously variable frequency in the method disclosed in reference to FIG. 7. However, as should be apparent to those knowledgeable in the pertinent arts, the same is applicable, with equal force, to all of the above-disclosed methods employing a frequency sweep comprising a continuously variable frequency.

Figure 12:
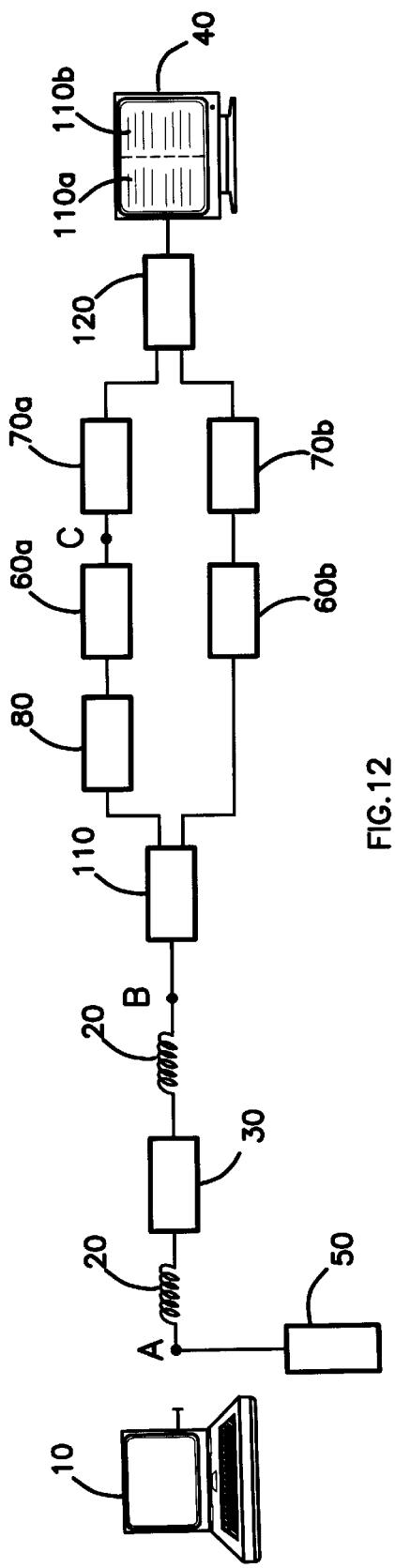
FIG. 12 provides a schematic presentation of the steps of evaluating performance of a video system and compensation for degradation of video signals caused by the video system by using a video splitter according to the present invention.

Referring now to FIG. 12, a method will now be explained which permits comparison of the images generated by the degraded frequency sweep outputted by the video system that is being evaluated with the images generated by the frequency sweep after passing through the means of compensation by simultaneously displaying the degraded and adjusted images on different portions of the screen of the video display device. The degraded frequency sweep present at Junction B is placed in electrical communication with a Signal Splitting Means 110. Signal Splitting Means 110 converts the degraded frequency sweep into two substantially identical portions of said degraded frequency sweep. One of this identical portions is passed through Compensation Means 80, Amplitude Peak Level Detector 60a and Means of Color Coding 70a (shown as the upper portion of the "split" in FIG. 12). The other one of this identical portions is not passed through Compensation Means 80, but instead applied directly to Amplitude Peak Level Detector 60b and Means of Color Coding 70b (shown as the lower portion of the "split" in FIG. 12). As a result, Means of Color Coding 70a outputs a signal corresponding to the adjusted frequency sweep (since the signal has passed through Compensation Means 80). On the other hand, Means of Color Coding 70b outputs a signal corresponding to the degraded frequency sweep (since the signal has not passed through any compensation means).

The outputs of Means of Color Coding 70a and Means of Color Coding 70b are then placed in electrical communication with a Means of Combining Video Signals 120. Means of Combining Video Signals 120 combines the signal corresponding to the adjusted frequency sweep with the signal corresponding to the degraded frequency sweep in a way that images generated by these two signals can be displayed simultaneously on different portions of the screen of Video Display Device 40. As shown on the right hand side of FIG. 12, Adjusted Image 110a is displayed on the left half of the screen of Video Display Device 40 and Degraded Image 110b is displayed on the right half of the screen of Video Display Device 40. Adjusted Image 110a can then be adjusted by altering controls of Compensation Means 80 while being compared to Degraded Image 110b simultaneously displayed on the screen of Video Display Device 40.

Figure 13:
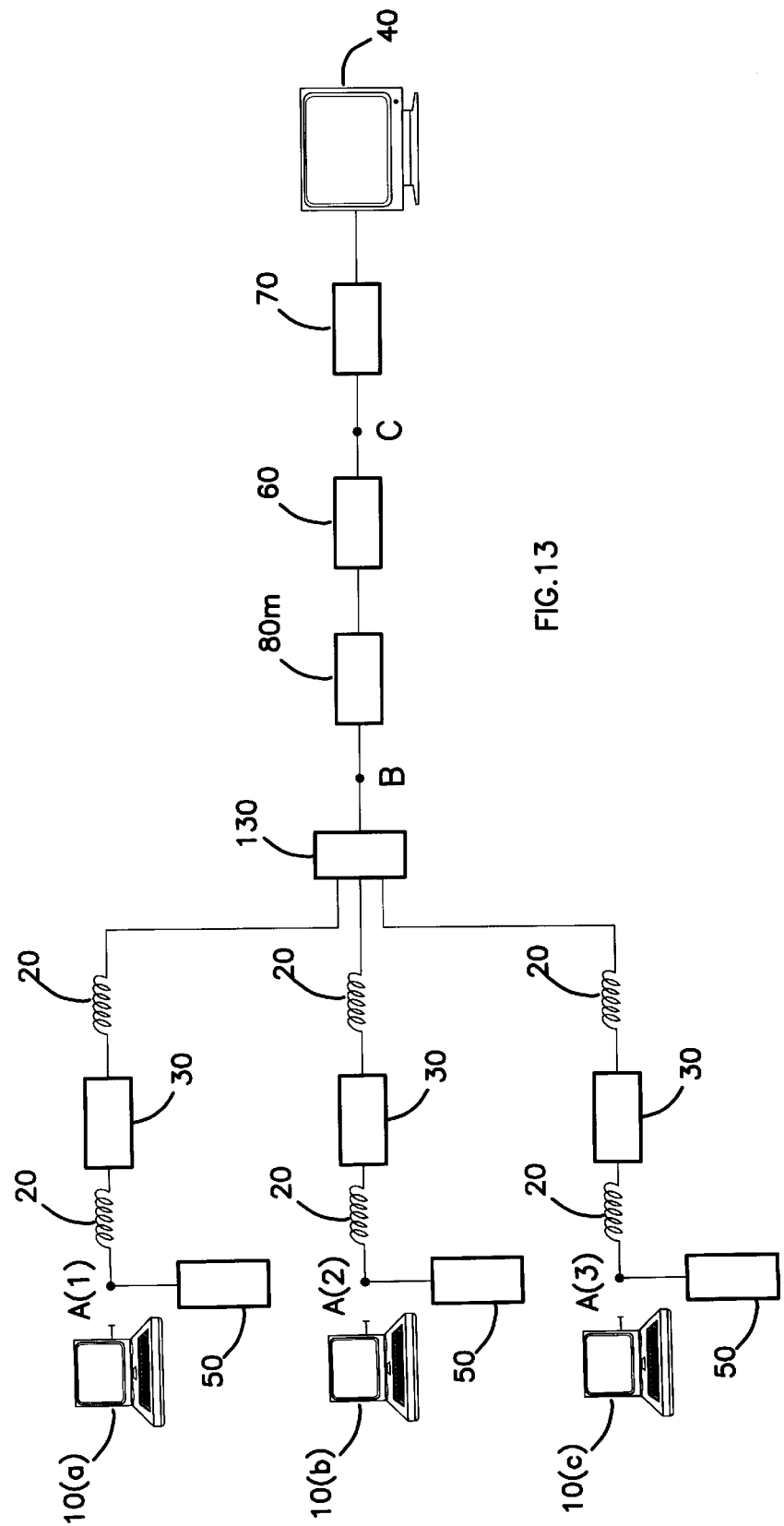
FIG. 13 provides a schematic presentation of the steps of evaluating performance of a video system and compensation for degradation of video signals caused by the video system by using a compensation means equipped with memories for adjustment settings according to the present invention.

Referring now to FIG. 13, there is shown a circuit arrangement previously described in reference to FIG. 7, in which there are multiple sources of video signals and associated circuitry. One of the multiple sources at a time is switched, so that it will be presented on the video display device. In practice, each of the possible sources is switched one at a time, video signal that has passed through the circuit is conducted to a compensation means equipped with memories for adjustment settings, the amplitude peak level detector, the means of color coding, and the video display device. A technician will make adjustments to the compensation means equipped with memories for adjustment settings to compensate for the degradation. These settings are then stored in the memory in a manner that associates these particular settings with the particular video source and associated circuitry being compensated.

Then in sequence, each of the other video sources and related circuitry are switched in the circuit, a new group of settings are determined for the new video source and those new settings are stored in the memory. After all settings have been stored, then when a particular video source and associated circuitry needs to be used, one would switch the compensation means to the settings corresponding to that particular video source and associated circuitry and video signal will be corrected and compensated in the manner that has been previously determined to be efficacious for this particular video source and associated circuitry.

Starting on the left hand portion of FIG. 13, there is shown three sources of video signals, Video Signal Source 10a, Video Signal Source 10b, and Video Signal Source 10c. Associated with each video signal source, is a complete and separate set of Cables 20 and Intermediary Circuits 30, and for each video signal source there is a unique compilation of Cables 20 and Intermediary Circuits 30. Though FIG. 13 shows three possible video signal sources, this is done for the purpose of having the figure to be a reasonable size. There is no practical limit as to the number of possible video signal sources that could be included within the description as set forth herein.

Frequency sweep generated by Generator of Frequency Sweep 50 is passed through each of the Cables 20 and Intermediary Circuits 30 unique to each video signal source and placed in electrical communication with Switcher 130. Switcher 130 switches frequency sweeps that has passed through each of the Cables 20 and Intermediary Circuits 30 unique to each video signal source one at a time and outputs degraded frequency sweeps at Junction B. To the right of Junction B, the steps are essentially the same as described in reference to FIG. 7, i.e., the degraded frequency sweep is then passed through a Compensation Means Equipped with Memories 80m, Amplitude Peak Level Detector 60, Means of Color Coding 70. Means of Color Coding 70 outputs a low frequency signal which is applied to Video Display Device 40. The only additional step is storing adjustment setting corresponding to a particular video signal source and associated Cables 20 and Intermediary Circuits 30 into memory of Compensation Means Equipped with Memories 80m in the manner described above.

Figure 14:
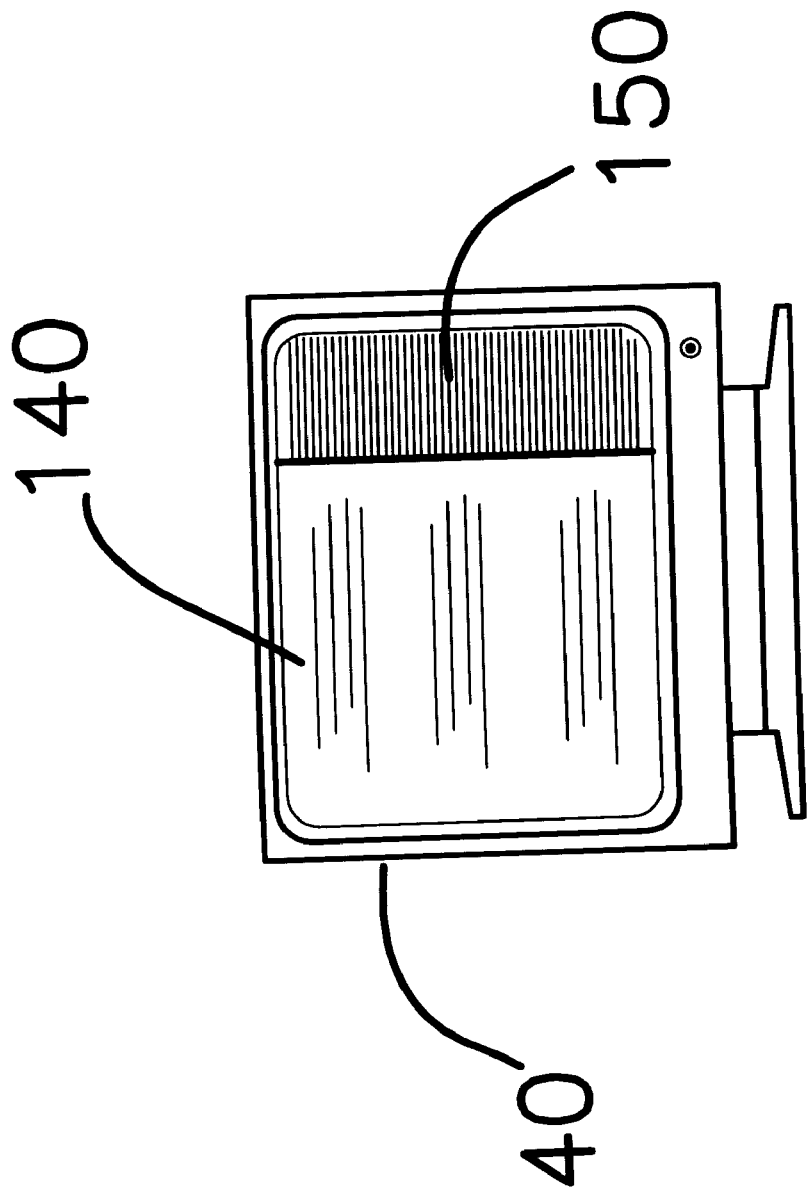
FIG. 14 provides a schematic presentation of the screen of the video display device with a reference bar located on the right hand side for comparison purposes.

Referring now to FIG. 14, there is shown Video Display Device 40 with numeral 140 indicating an image generated by the degraded frequency sweep (Degraded Image) and numeral 150 indicating Reference Level Signal. In this example, Degraded Image 140 is shown as a number of horizontal scan lines and Reference Level Signal 150 is shown as a vertical bar located on the right side of the screen. Brightness of these horizontal scan lines comprising Degraded Image 140 can be compared with the brightness of Reference Level Signal 150. Reference Level Signal 150 can be located anywhere on the screen of Video Display Device 40 for easy comparison.

If colors, rather than brightness of images, are used to evaluate performance of a video system, colors of the scan lines which comprise Degraded Image 140 can be compared with the reference colors of Reference Level Signal 150.

While the present invention has been described and defined by reference to particularly preferred embodiments of the invention, such reference does not imply a limitation on the invention, and no such limitation is to be inferred. The invention is capable of considerable modification, alteration, and equivalents in form and function, as will occur to those ordinarily skilled in the pertinent arts.

The depicted and described preferred embodiment of the invention is exemplary only, and is not exhaustive of the scope of the invention. Consequently, the invention is intended to be limited only by the spirit and scope of the appended claims, giving full cognizance to equivalents in all respects. Specifically, those ordinarily skilled in the pertinent arts will recognize that the present invention, or its equivalents, is not limited to video signals, but can be used with any type of signals that can be visually represented and which degrade due to passing through components of a system.

What is claimed is:

1. A method of evaluating performance of a video system comprising the steps of:

(a) generating a frequency sweep comprising a signal comprising a sinewave of a continuously variable frequency such that the frequency range of said frequency sweep comprises at least one frequency expected to be transmitted by the video system;

(b) placing said frequency sweep in communication with an input of the video system;

(c) passing said frequency sweep through the video system thereby causing the video system to output a degraded frequency sweep having amplitude variations;

(d) placing said degraded frequency sweep in communication with a means of detecting amplitude peak levels;

(e) passing said degraded frequency sweep through the means of detecting amplitude peak levels thereby causing said means of detecting amplitude peak levels to output a low frequency signal having amplitude variations corresponding to the amplitude variations occurring in said degraded frequency sweep;

(f) placing said low frequency signal in communication with a means of visual representation of video signals;

(g) causing said means of visual representation of video signals to display visual representations of said degraded frequency sweep in a way that the visual representations of said degraded frequency sweep are presented separate from each other and each representation is not altered by the visual representation of any other signal, and brightness of each visual representation corresponds to the amplitude variation occurring in said degraded frequency sweep;

(h) evaluating performance of the video system by observing the brightness of the visual representations of said degraded frequency sweep.

2. A method of evaluating performance of a video system comprising the steps of:

(a) generating a frequency sweep comprising a signal comprising a sinewave of a continuously variable frequency such that the frequency range of said frequency sweep comprises at least one frequency expected to be transmitted by the video system;

(b) placing said frequency sweep in communication with an input of the video system;

(c) passing said frequency sweep through the video system thereby causing the video system to output a degraded frequency sweep having amplitude;

(d) placing said degraded frequency sweep in communication with a means of detecting amplitude peak levels;

(e) passing said degraded frequency sweep through the means of detecting amplitude peak levels thereby causing said means of detecting amplitude peak levels to output a low frequency signal having amplitude variations corresponding to the amplitude variations occurring in said degraded frequency sweep;

(f) providing a means of color coding capable of encoding video signals having different amplitudes with selected colors so that visual representations of video signals having different amplitudes can be displayed in selected colors corresponding to each amplitude;

(g) placing said low frequency signal having amplitude variations corresponding to the amplitude variations occurring in said degraded frequency sweep in communication with said means color coding;

(h) passing said low frequency signal having amplitude variations corresponding to the amplitude variations occurring in said degraded frequency sweep through said means of color coding causing said means of color coding to output a low frequency signal having selected values of amplitude variations occurring in said degraded frequency sweep encoded with a selected colors;

(i) placing said low frequency signal having selected values of amplitude variations occurring in said degraded frequency sweep encoded with selected colors in communication with a means of visual representation of video signals;

(j) causing said means of visual representation of video signals to display visual representations of said degraded frequency sweep in a way that the visual representations of said degraded frequency sweep are presented separate from each other and each representation is not altered by the visual representation of any other signal, and color of each visual representation corresponds to the selected value of amplitude variation occurring in said degraded frequency sweep;

(k) evaluating performance of the video system by the colors of the visual representations of said degraded frequency sweep.

3. A method of evaluating performance of a video system and compensating for degradation of video signals caused by the video system comprising the steps of:

(a) generating a frequency sweep comprising a signal comprising a sinewave of a continuously variable frequency such that the frequency range of said frequency sweep comprises at least one frequency expected to be transmitted by the video system;

(b) placing said frequency sweep in communication with an input of the video system;

(c) passing said frequency sweep through the video system thereby causing the video system to output a degraded frequency sweep having amplitude variations;

(d) providing a compensation means having an input, an output, and adjustment controls, placing said degraded frequency sweep in communication with the input of said compensation means;

(e) placing the output of said compensation means in communication with a means of detecting amplitude peak levels;

(f) passing said degraded frequency sweep through the means of detecting amplitude peak levels thereby causing said means of detecting amplitude peak levels to output a low frequency signal having amplitude variations corresponding to the amplitude variations occurring in said degraded frequency sweep;

(g) placing said low frequency signal in communication with a means of visual representation of video signals;

(h) causing said means of visual representation of video signals to display visual representations of said degraded frequency sweep in a way that the visual representations of said degraded frequency sweep are presented separate from each other and each representation is not altered by the visual representation of any other signal, and brightness of each visual representation corresponds to the amplitude variation occurring in said degraded frequency sweep;

(i) evaluating performance of the video system by observing the brightness of the visual representations of said degraded frequency sweep;

(j) altering said adjustment controls of said compensation means so that the brightness of the visual representations of said degraded frequency sweep appears as uniform as possible.

4. A method of evaluating performance of a video system and compensating for degradation of video signals caused by the video system comprising the steps of:

(a) generating a frequency sweep comprising a signal comprising a sinewave of a continuously variable frequency such that the frequency range of said frequency sweep comprises at least one frequency expected to be transmitted by the video system;

(b) placing said frequency sweep in communication with an input of the video system;

(c) passing said frequency sweep through the video system thereby causing the video system to output a degraded frequency sweep having amplitude variations;

(d) providing a compensation means having an input, an output, and adjustment controls, placing said degraded frequency sweep in communication with the input of said compensation means;

(e) placing the output of said compensation means in communication with a means of detecting amplitude peak levels;

(f) passing said degraded frequency sweep through the means of detecting amplitude peak levels thereby causing said means of detecting amplitude peak levels to output a low frequency signal having amplitude variations corresponding to the amplitude variations occurring in said degraded frequency sweep;

(g) providing a means of color coding capable of encoding video signals having different amplitudes with selected colors so that visual representations of video signals having different amplitudes can be displayed in selected colors corresponding to each amplitude;

(h) placing said low frequency signal having amplitude variations corresponding to the amplitude variations occurring in said degraded frequency sweep in communication with said means color coding;

(i) passing said low frequency signal having amplitude variations corresponding to the amplitude variations occurring in said degraded frequency sweep through said means of color coding causing said means of color coding to output a low frequency signal having selected values of amplitude variations occurring in said degraded frequency sweep encoded with selected colors;

(j) placing said low frequency signal having selected values of amplitude variations occurring in said degraded frequency sweep encoded with selected colors in communication with a means of visual representation of video signals;

(k) causing said means of visual representation of video signals to display visual representations of said degraded frequency sweep in a way that the visual representations of said degraded frequency sweep are presented separate from each other and each representation is not altered by the visual representation of any other signal, and color of each visual representation corresponds to the selected value of amplitude variation occurring in degraded frequency sweep;

(l) evaluating performance of the video system by the colors of the visual representations of said degraded frequency sweep;

(m) altering said adjustment controls of said compensation means so that the color of the visual representations of said degraded frequency sweep corresponds to the smallest value of amplitude variation occurring in said degraded frequency sweep.

5. A method as recited in claim 1, in which said visual representations of said degraded frequency sweep are horizontal scan lines.

6. A method as recited in claim 2, in which said visual representations of said degraded frequency sweep are horizontal scan lines.

7. A method as recited in claim 3, in which said visual representations of said degraded frequency sweep are horizontal scan lines.

8. A method as recited in claim 4, in which said visual representations of said degraded frequency sweep are horizontal scan lines.

9. A method as recited claim 1, in which said visual representations of said degraded frequency sweep are vertical scan lines.

10. A method as recited claim 2, in which said visual representations of said degraded frequency sweep are vertical scan lines.

11. A method as recited claim 3, in which said visual representations of said degraded frequency sweep are vertical scan lines.

12. A method as recited claim 4, in which said visual representations of said degraded frequency sweep are vertical scan lines.

13. A method as recited claim 1, in which a frequency sweep comprising a signal comprising a sinewave of a plurality of fixed frequencies is used instead of said frequency sweep comprising a signal comprising a sinewave of a continuously variable frequency recited in step (a).

14. A method as recited claim 2, in which a frequency sweep comprising a signal comprising a sinewave of a plurality of fixed frequencies is used instead of said frequency sweep comprising a signal comprising a sinewave of a continuously variable frequency recited in step (a).

15. A method as recited claim 3, in which a frequency sweep comprising a signal comprising a sinewave of a plurality of fixed frequencies is used instead of said frequency sweep comprising a signal comprising a sinewave of a continuously variable frequency recited in step (a).

16. A method as recited claim 4, in which a frequency sweep comprising a signal comprising a sinewave of a plurality of fixed frequencies is used instead of said frequency sweep comprising a signal comprising a sinewave of a continuously variable frequency recited in step (a).

17. A method as recited in claim 1, in which said compensation means is equipped with memories capable of storing adjustment settings for various video systems.

18. A method as recited in claim 2, in which said compensation means is equipped with memories capable of storing adjustment settings for various video systems.

19. A method as recited in claim 3, in which said compensation means is equipped with memories capable of storing adjustment settings for various video systems.

20. A method as recited in claim 4, in which said compensation means is equipped with memories capable of storing adjustment settings for various video systems.

21. A method as recited in claim 1, further comprising the steps of causing said means of visual representation of video signals to display an image having reference brightness level and using said image having reference brightness level for comparison with the brightness of the visual representations of said degraded frequency sweep as reference.

22. A method as recited in claim 3, further comprising the steps of causing said means of visual representation of video signals to display an image having reference brightness level and using said image having reference brightness level for comparison with the brightness of the visual representations of said degraded frequency sweep as reference.

23. A method as recited in claim 2, further comprising the steps of causing said means of visual representation of video signals to display an image having reference colors and using said image having reference colors for comparison with the colors of the visual representations of said degraded frequency sweep as reference.

24. A method as recited in claim 4, further comprising the steps of causing said means of visual representation of video signals to display an image having reference colors and using said image having reference colors for comparison with the colors of the visual representations of said degraded frequency sweep as reference.

25. A method as recited in claim 1, in which said frequency sweep is synchronous with vertical sync pulses.

26. A method as recited in claim 2, in which said frequency sweep is synchronous with vertical sync pulses.

27. A method as recited in claim 3, in which said frequency sweep is synchronous with vertical sync pulses.

28. A method as recited in claim 4, in which said frequency sweep is synchronous with vertical sync pulses.

29. A method as recited in claim 1, in which said frequency sweep is synchronous with horizontal sync pulses.

30. A method as recited in claim 2, in which said frequency sweep is synchronous with horizontal sync pulses.

31. A method as recited in claim 3, in which said frequency sweep is synchronous with horizontal sync pulses.

32. A method as recited in claim 4, in which said frequency sweep is synchronous with horizontal sync pulses.

33. A method of evaluating performance of a video system and compensating for degradation of video signals caused by the video system comprising the steps of:

(a) generating a frequency sweep comprising a signal comprising a sinewave of a continuously variable frequency such that the frequency range of said frequency sweep comprises at least one frequency expected to be transmitted by the video system;

(b) placing said frequency sweep in communication with an input of the video system;

(c) passing said frequency sweep through the video system thereby causing the video system to output a degraded frequency sweep having amplitude variations;

(d) providing a signal splitting means having an input and at least a first and a second identical output, placing said degraded frequency sweep in communication with said input of said signal splitting means whereby each of said first and said second outputs carries respectively a first substantially identical portion of said degraded frequency sweep and a second substantially identical portion of said degraded frequency sweep;

(e) providing a compensation means having an input, an output, and adjustment controls, placing said first output of said signal splitting means in communication with the input of said compensation means, passing said first substantially identical portion of said degraded frequency sweep through the compensation means thereby causing it to output an adjusted signal;

(f) placing the output of said compensation means in communication with a first means of detecting amplitude peak levels;

(g) passing said adjusted signal through the first means of detecting amplitude peak levels thereby causing said first means of detecting amplitude peak levels to output a low frequency signal having amplitude variations corresponding to the amplitude variations occurring in adjusted signal;

(h) placing said second output of said signal splitting means in communication with a second means of detecting amplitude peak levels;

(i) passing said second substantially identical portion of said degraded frequency sweep (degraded signal) through the second means of detecting amplitude peak levels thereby causing said second means of detecting amplitude peak levels to output a low frequency signal having amplitude variations corresponding to the amplitude variations occurring in said degraded signal;

(j) providing a means of combining video signals, placing said low frequency signal having amplitude variations corresponding to the amplitude variations occurring in said adjusted signal and said low frequency signal having amplitude variations corresponding to the amplitude variations occurring in said degraded signal in communication with said means of combining electrical signals;

(k) passing said low frequency signal having amplitude variations corresponding to the amplitude variations occurring in adjusted signal and said low frequency signal having amplitude variations corresponding to the amplitude variations occurring in said degraded signal through said means of combining electrical signals and causing said means of combining electrical signals to output a combined low frequency signal comprising two portions, one portion being said low frequency signal having amplitude variations corresponding to the amplitude variations occurring in said degraded signal and the other portion being said low frequency signal having amplitude variations corresponding to the amplitude variations occurring in said adjusted signal;

(l) placing said low frequency signal comprising two portions in communication with a means of visual representation of video signals;

(m) causing said means of visual representation of video signals to display visual representations of said low frequency signal comprising two portions in a way that the visual representations of each of said two portions are presented on different portions of the screen of the means of visual representation of video signals and visual representations of said degraded frequency sweep on each of said different portions of the screen are presented separate from each other and each representation is not altered by the visual representation of any other signal, and brightness of each visual representation corresponds to the amplitude variation occurring in said degraded frequency sweep;

(n) evaluating performance of the video system by observing the brightness of the visual representations of said degraded frequency sweep;

(o) altering said adjustment controls of said compensation means so that the brightness of the visual representations of said low frequency signal having amplitude variations corresponding to the amplitude variations occurring in said adjusted signal appears as uniform as possible, while comparing it to the visual representation of said low frequency signal having amplitude variations corresponding to the amplitude variations occurring in said degraded signal simultaneously displayed on a different portion of the screen of the means of visual representation of video signals.

* * * * *